Oct. 22, 1963  R. I. N. WEINGART  3,107,928
DATA PROCESSING ASSEMBLY AND METHOD
Filed March 27, 1961  2 Sheets-Sheet 1
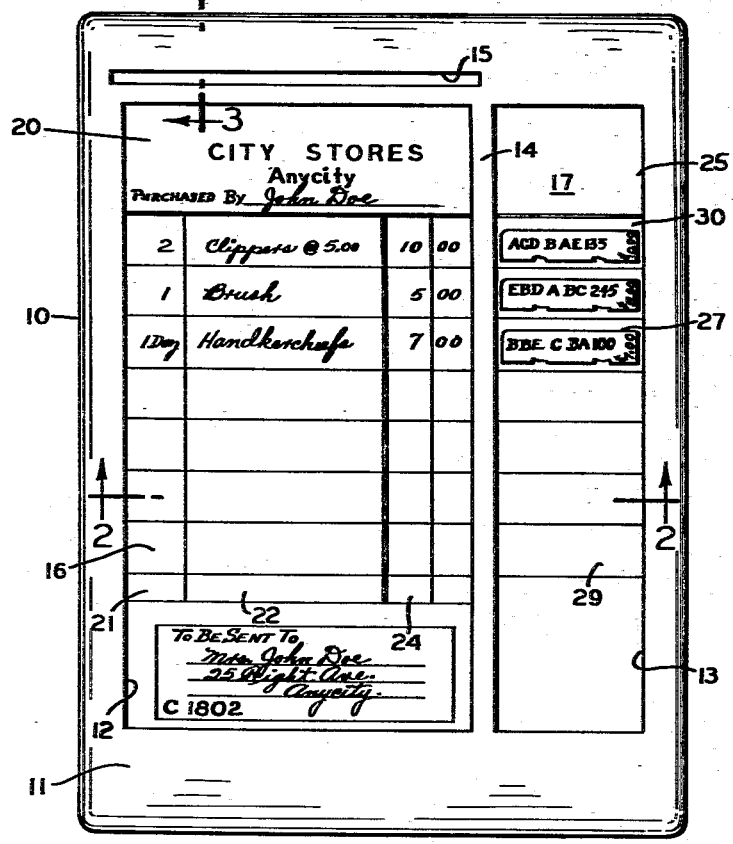
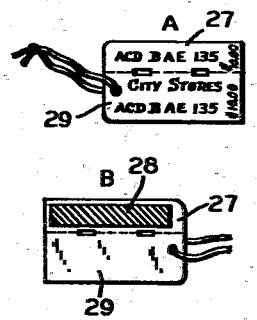
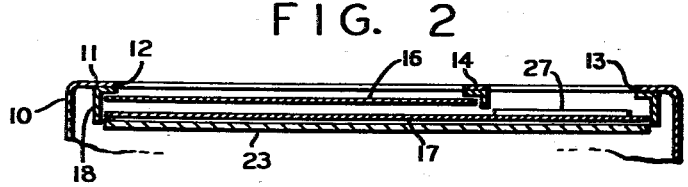
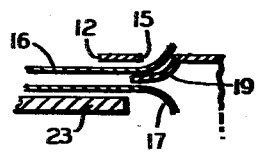
INVENTOR.
RICHARD I. N. WEINGART
BY
HIS ATTORNEY.

Oct. 22, 1963 R. I. N. WEINGART 3,107,928
DATA PROCESSING ASSEMBLY AND METHOD
Filed March 27, 1961 2 Sheets-Sheet 2
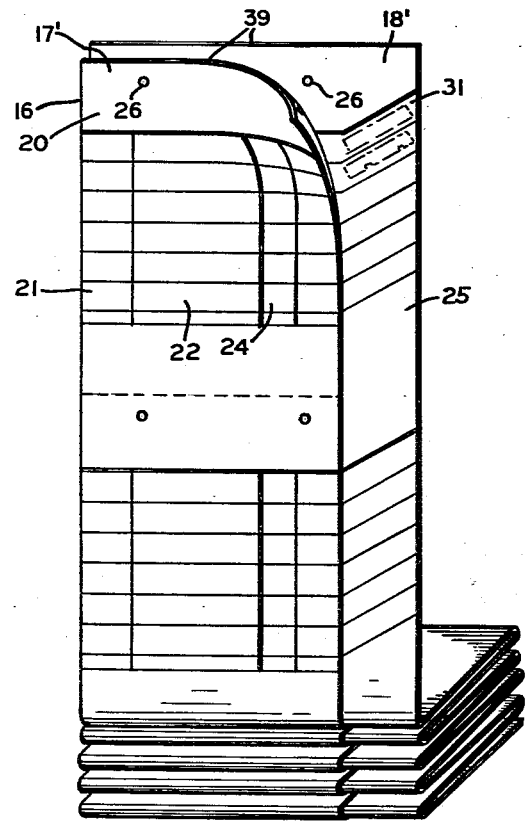
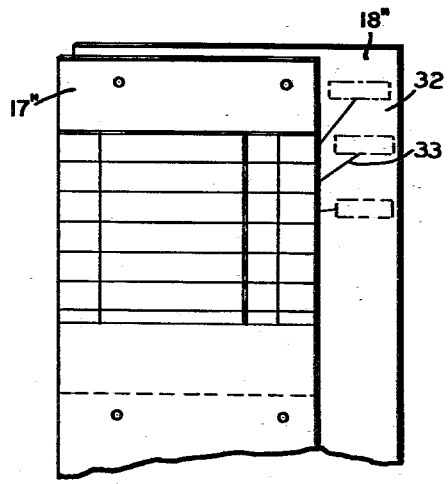
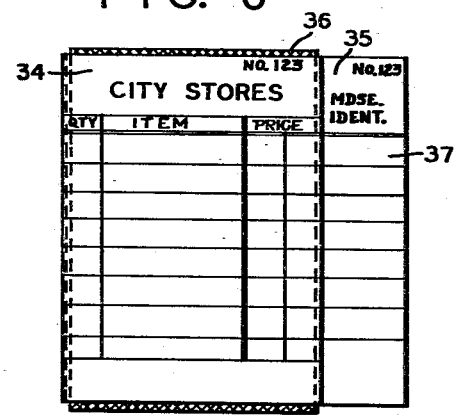
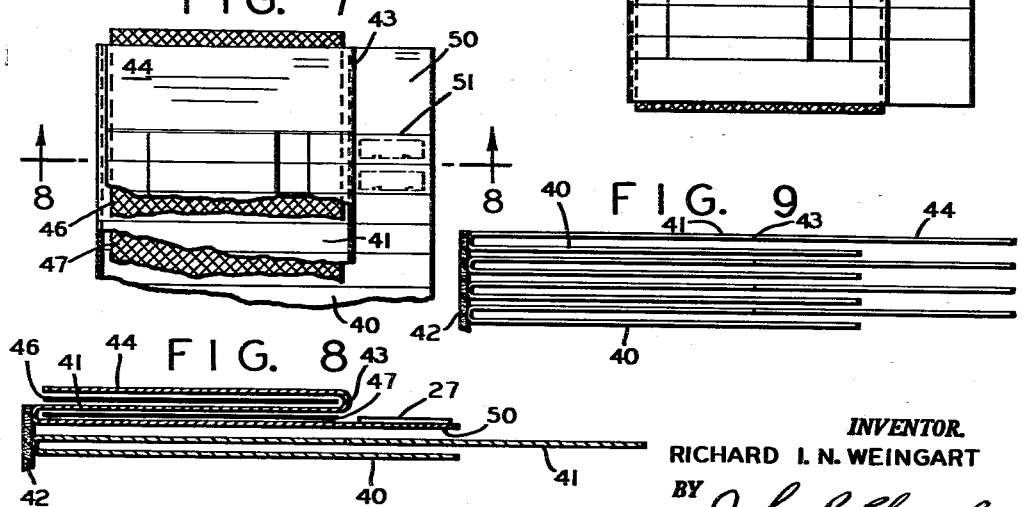
INVENTOR.
RICHARD I. N. WEINGART
BY John P. Chandler
HIS ATTORNEY.

United States Patent Office 3,107,928
Patented Oct. 22, 1963

3,107,928
DATA PROCESSING ASSEMBLY AND METHOD
Richard I. N. Weingart, Nassau, Bahamas, assignor to
Universal Controls, Inc.
Filed Mar. 27, 1961, Ser. No. 98,628
4 Claims. (Cl. 282—3)

This invention has reference to data processing assemblies of the kind in which data concerning the sale of an article in a retail store is written on a form of a stationery assembly including one or more duplicate carbon copies and one of the duplicates is given the customer at the time of the sale while the others are retained for record purposes by the store.

An important object of the invention is to provide an improved assembly of this kind, either as a bound book of individual sales slip units, each with one or more carbon copies, or as a continuous web for use in autographic registers, wherein the amount of data recorded on the copy for the accounting department can be materially increased and by means of which the details of the sale can be checked.

When a customer makes a purchase in a store it is customary to record the sale, for example, on a continuous form assembly in an autographic register and to enter details of the transaction on the form by handwriting. It is usual to include details of the article sold as well as the number of such articles and the price. The original copy of such form is handed to the customer either for taking to a cash desk where the form is checked and the goods are paid for, or passed through a dispatch department with the goods, or handed direct to the customer with the article sold. The duplicate copy is fed into a security compartment in the autographic register where it is stored until the end of the day when a length of such continuous forms are removed and are used, for example, for stock control purposes.

In such systems it is sometimes found desirable to have additional information incorporated on the filed copy of the form assembly filed in the autographic register.

In accordance with the present invention a business form assembly comprises a plurality of continuous stationery webs, each web being divided into form lengths and an underlying web having a width greater than the webs of the assembly located above it and the projecting part of the form providing an area for having affixed thereto a label on which data information, coded or otherwise, is imprinted or punched.

An object of the invention is to provide a data processing stationery assembly comprising a plurality of sheets of stationery, each sheet having one or more data recording positions and at least one of the sheets of the assembly having a location for affixing data labels thereto and each data recording position being associated with a respective data label location.

The applied label is preferably one which is severed along a weakened line from a two-part label affixed to each article in the store. Each part of such label or tag has identical data printed thereon concerning the particular article, its size, its cost, etc., and this section so severed from the composite tag has a pressure sensitive adhesive area protected by a strippable backing. Then the label so severed is quickly affixed to the proper area provided therefor on the underlying sheet with its widened and exposed margin and this gives the auditing department full inventory and sales data. Of equal importance is the fact that in the method of the present invention it is applied before the forms are filled in so the possibility of making an error in the entry is or should be eliminated.

In the drawings:

FIG. 1 is a plan view of the sales sheet assembly in continuous web form in an autographic register of the type currently in wide use in stores;

FIG. 2 is a broken section taken on line 2—2 of FIG. 1;

FIG. 3 is a broken section taken on line 3—3 of FIG. 1;

FIG. 4 is a perspective view of a continuous sales assembly of the present invention with the superimposed sheets of the web;

FIG. 5 shows a modified form of area locating means for the adhesively applied tags;

FIG. 6 is a plan view of a modified arrangement for individual multi-copy sales clips embodying the present invention.

FIG. 7 is a broken plan view showing a sales book arrangement when the individual sales units are bound together into book form;

FIG. 8 is a section on line 8—8 of FIG. 7;

FIG. 9 shows the initial arrangement of FIG. 7 before the double upper sheet is folded;

FIG. 10 is a plan view of the front and back of the two-part sales tag initially affixed to the article in the store.

For the purpose of the present invention sheets and webs are considered as equivalents and some type of transfer sheet is present between the superimposed forms in all embodiments of the invention.

An autographic register for use in the present invention is shown in FIGS. 1, 2, and 3 and it includes a housing having side walls 10 and an upper wall 11 having a large rectangular opening 12 and a smaller opening 13, both extending from front to back of the housing and leaving a narrow bar 14 between the openings, thus forming two frames. To the rear of the larger frame is a narrow slot-like opening 15 through which the upper sheet, to be handed to the customer, is fed.

By referring to FIG. 1 it will be noted that the stationery assembly comprises a plurality of paper webs 16 and 17, the latter of which is wider. The housing has suitable guides 18 for the webs during their longitudinal travel, the intermediate one of which is of lesser depth then the other two since the wider web 17 moves beneath it. A curved baffle plate 19 extending downwardly from the forward edge of slot 15 guides the upper web upwardly through such opening while the other web passes into a security compartment at the lower end of the housing. A platen 23 supports the lower sheet during writing. The paper webs 16 and 17 are divided into form lengths, each of which is of the same dimensions and has an area 20 adjacent the leading end of the form within which area the name and address of the business concern is printed. The remainder of the form is divided into areas for having data applied thereto as by writing. There is a first column 21 for the insertion of the number of a given article purchased, the second column 22 has an area for the insertion of a description of the article and the third column 24 has provision for insertion of the cost of article purchased.

The leading end 39 of each form length has two holes 26 to control feeding of the form lengths in the autographic register using the usual friction feed. The holes are sensed to disconnect the feed when one unit has been issued.

The lowermost web 17 of the assembly which is wider than the web or webs located above it has a part 25 projecting beyond the top web on which a plurality of areas are marked or delineated for having an adhesive label affixed, the label having informational data imprinted thereon. The projecting area lies sufficiently to one side of the form so that the feed control holes are located in the body of the lowermost form as well as in all the other webs of the assembly. In particular these data areas are marked out and are of a suitable size to accommodate a tag or label, or a part thereof removed from, for example, a garment purchased in a shop.

A tag for use in the system of the present invention is shown in FIG. 10 and it includes a section 27 which has an adhesive area 28 on its rear face which is initially covered by a protective sheet (not shown) which is readily stripped therefrom so that this tag section 27 can be affixed in an area provided to receive the same on lowermost web 17. The tag section 27 is carried along a weakened line by the main tag section 29 suitably affixed to the article as by a string. Both tag sections usually have identical data, secretly coded or otherwise, printed or punched therein.

Each area which is provided for having the label affixed thereto is associated with an appropriate line printed on the body of the form length. Thus, in the arrangement of FIGS. 1 and 4, there are six horizontal lines, each divided in four columns, for having data inserted on the body of the form and each of these six lines correspond to and are connected by adjoining lines with six respective positions in which the labels 27 are to be affixed.

In the arrangement of FIG. 1 the areas 30 extend directly to the right, and in FIG. 4 there are the upper and lower webs 17' and 18', respectively, and the latter has the areas 31 inclined diagonally upwardly, while in FIG. 5 the areas 32 are spaced apart further than they are in FIGS. 1 and 4 and are indicated by lines 33 leading to the individual areas which accommodate labels of greater depth than do the areas of FIGS. 1 and 4. The upper and lower sheets here are designated 17" and 18". The arrangement in all three cases is such that the adhesively applied tags 27 are visible to the sales clerk while entering sales data on the original. It will be noted in FIG. 1 that the laterally projecting portion 25 of the lower web 17 is enclosed within frame 13 and when all of the data has been written on the form the assembly is fed, causing the top copy to pass through opening 15 in the top wall of the register, to be torn from the web, while the lower copy is fed into a security compartment. At the end of the day the web, comprising the lower copy, and the attached labels are removed from the register and used, for example for stock control purposes.

In the form of the invention of FIG. 6 the continuous web is replaced in individual sales slips initially attached together and including an upper sheet 34 arranged generally like the form lengths of the web in FIGS. 4 and 5 with suitable columns for the sales data. There is also a lowermost sheet 35 with a carbon sheet 36 therebetween and one or more intermediate sheets if desired. The lowermost sheet is wider than upper sheet 33 and provides a laterally extending margin 37 with suitable areas to receive the applied tags 27. If desired these units may be made into book form.

In the arrangement of FIGS. 7-9 the sales data processing assembly includes a plurality of units each comprising a lower sheet 40 and an upper sheet 41 which may be connected integrally with the lower sheet and the several units are carried in a binder 42. One half of the upper sheet is arranged to be folded along center line 43 over the remaining half to form an upper layer 44 with a carbon sheet 46 therebetween. A second carbon sheet 47 is disposed between sheet 41 and lower sheet 40 which latter has a width greater than one half the width of the upper sheet. Accordingly, when sheet 41 is folded as indicated, the lower sheet 40 has a laterally extending margin 50 to receive the adhesively applied tags 27. This margin may have lines 51 marking out the areas receiving the tags.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and ranges of equivalency of the claims are intended to be included therein.

What I claim is:

1. A data processing stationery assembly for use in the sale of articles in stores and including a plurality of superimposed sheets of stationery, each having a plurality of data recording positions, the uppermost sheet being narrower than the lowermost sheet, the latter thus having a laterally disposed extension and being divided into a plurality of areas, and means relating said areas to the data recording position, and an adhesively coated label forming part of a merchandise tag applied to at least one of said areas.

2. A data processing stationery assembly comprising a plurality of superimposed webs of paper of which the lower web is the wider and at least one upper web is of lesser width and exposing a margin on one side of the lower web, a transfer sheet between the webs, and a platen supporting the webs for entering data thereon, a housing for the plate and webs and provided with plural openings in its upper wall, one for the upper web, one for the margin of the lower web, and a transverse opening above the first opening to permit the leading edge of the upper web to pass therethrough and be severed from said web while the lower web passes into the lower part of the housing, each web being divided into a plurality of separate sheets and having a plurality of data recording positions thereon, the exposed margin of the lower sheet being divided into a plurality of areas, means relating said areas to the data recording positions and separately applied, adhesively coated, labels forming part of a merchandise tag carried in certain of said areas.

3. A data processing stationery assembly comprising a plurality of superimposed webs of paper wherein the lower web is wider then the upper web and exposing a margin on one side of the lower web, a transfer sheet between the webs, and a platen supporting the webs for entering data thereon, a housing for the platen and webs and provided with an opening in its upper wall to permit writing on the web and another opening to permit the leading edge of the web to pass therethrough and be severed from said web while the lower web passes into the lower part of the housing, each web being divided at a plurality of separate sheets and having a plurality of data recording positions thereon, the exposed margin of the lower sheet being divided into a plurality of areas, and adhesively coated labels forming part of a merchandise tag applied in said areas.

4. A data processing stationery assembly comprising a plurality of superimposed webs of paper wherein the lower web is the wider and the upper web of lesser width and exposing a margin on one side of the lower web, a transfer sheet between the webs, and a platen receiving the webs for entering data thereon, a housing for the platen and webs and provided with an opening in the upper wall for the webs, each web being divided at a plurality of separate sheets and having a plurality of data recording positions thereon, the exposed margin of the lower sheet being divided into a plurality of areas, separately applied, adhesively coated, labels forming part of a merchandise tag carried by certain of said areas, and means relative to said area to the data recording position.

References Cited in the file of this patent

UNITED STATES PATENTS

| | | |
|---|---|---|
| 600,094 | Shoup | Mar. 1, 1891 |
| 621,387 | Toborg | Mar. 21, 1899 |
| 994,234 | Aikens | June 6, 1911 |
| 1,812,605 | Pfeiffer | June 30, 1931 |
| 2,220,708 | Close | Nov. 5, 1940 |
| 2,854,257 | Williams | Sept. 30, 1958 |